R. M. WINSCH.
ANTISKIDDING DEVICE FOR WHEELS.
APPLICATION FILED FEB. 15, 1909.
921,936.
Patented May 18, 1909.
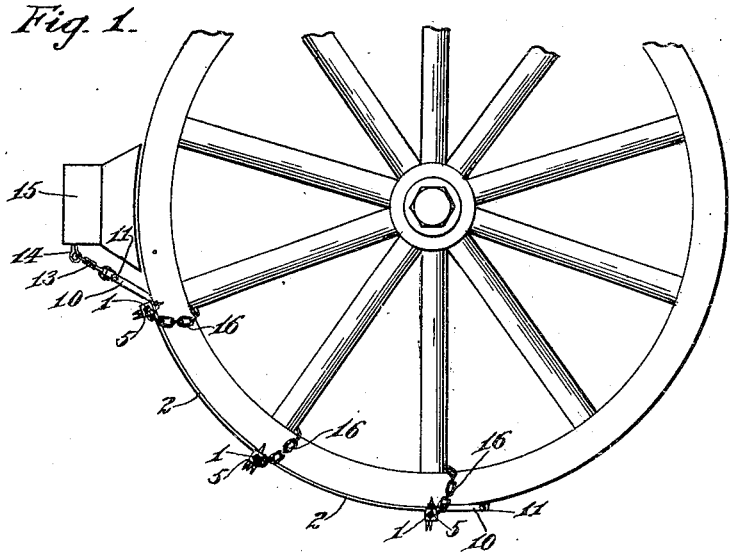
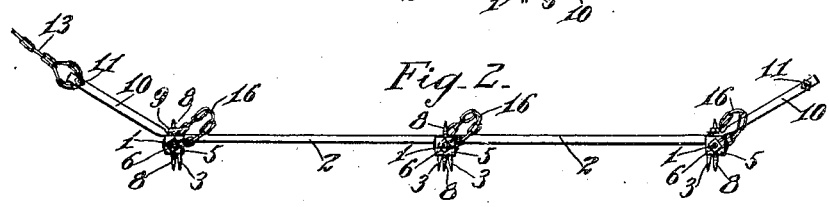
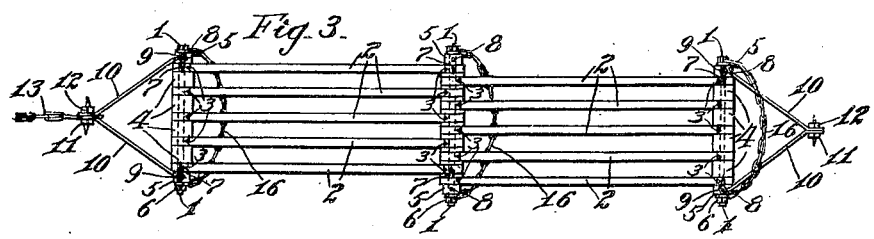
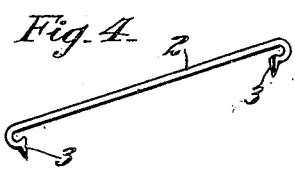
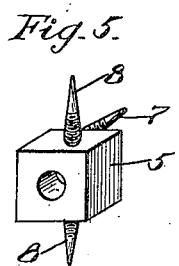
Witnesses
Inventor
Robert M. Winsch,
By Joshua R. H. Potts
Attorney

UNITED STATES PATENT OFFICE.

ROBERT M. WINSCH, OF LANSDALE, PENNSYLVANIA.

ANTISKIDDING DEVICE FOR WHEELS.

No. 921,936.  Specification of Letters Patent.  Patented May 18, 1909.

Application filed February 15, 1909.  Serial No. 477,921.

*To all whom it may concern:*

Be it known that I, ROBERT M. WINSCH, a citizen of the United States, residing at Lansdale, in the county of Montgomery and State of Pennsylvania, have invented certain new and useful Improvements in Antiskidding Devices for Wheels, of which the following is a specification.

My invention relates to an improved anti-skidding device, the object of the invention being to provide improvements of this character, which can be readily attached to a wheel, and which will prevent rotary movement of the wheel and also prevent skidding.

A further object is to provide improvements of this character which will readily operate to effectually clamp the wheel felly and provide it with means for connection with a portion of the vehicle, preferably the brake-beam, which will prevent any movement of the anti-skidding device, and the latter will prevent movement of the wheel.

With these and other objects in view, the invention consists in certain novel features of construction, and combinations, and arrangements of parts as will be more fully hereinafter described and pointed out in the claims.

In the accompanying drawings, Figure 1, is a view in side elevation illustrating the application of my improvements. Fig. 2, is an enlarged side or edge view of the device removed. Fig. 3, is an enlarged view in top plan. Figs. 4, 5 and 6 are enlarged views illustrating details of construction.

1, 1, 1, represent three transverse bolts, which are passed through the bent ends of longitudinal rods 2. As seen most clearly in Figs. 2 and 3, the rods 2 extend from an end bolt 1 to the center bolt 1, and from the latter to the other end bolt, thus permitting flexibility of the device.

The ends of all of the rods 2 are bent forming downwardly projecting teeth or prongs 3 to engage the ground and prevent skidding. On the end bolts 1, washers or spacing devices 4, of any approved character are provided between the rods 2 to hold them properly spaced, but at the center bolt there is no need of the spacing device, as the rods entirely cover the length of the bolt.

Located at the outside of the outside rods 2 are perforated blocks 5, through which the bolts 1 are passed, the heads of the bolts being against the blocks at one end, and nuts 6 are screwed on the bolts at the other end. These blocks are provided with inwardly projecting prongs or teeth 7 to be forced into the felly of the wheel, when the nuts are operated to clamp the blocks against the opposite sides of the wheel as seen in Fig. 1.

The blocks on the end bolts are provided with upwardly and downwardly projecting teeth or prongs 8, the upper of which are preferably screw threaded for the reception of nuts 9, adapted to clamp rods or links 10 in position. The rods or links 10 at the ends of the device are connected by means of a coupling 11, comprising a block having prongs or teeth at opposite sides, one at least of which is screw threaded to receive a nut 12 and lock the links together.

A chain 13 is secured to the links at one end of the device, and is adapted to be secured in a snap-hook 14, depending from the brace-beam 15, and prevent any rearward movement of the device, and the latter at each of its bolts 1 is provided with chains 16 adapted to be passed over the felly of the wheel and absolutely prevent any rotary movement of the wheel. These chains may be connected at their ends to the bolts 1 in any desired manner.

In operation, the anti-skidding device is fixed to the rim of the wheel as above explained, and when the wheel turns sufficiently, so as to properly position the device, the chain 13 is caught in the snap-hook 14 on the brake-beams 15, and will absolutely prevent any turning of the wheel, and the numerous prongs projecting downwardly from the rods, and the several blocks will absolutely prevent skidding.

By providing the links at both ends of the device, it is made reversible, and the rods 2 are sufficiently flexible to conform to the contour of the wheel rim as shown in Fig. 1.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. A device of the character described, comprising a series of transverse bolts, and a series of longitudinal rods connecting the bolts and having downwardly bent ends, and devices on said bolts adapted to secure the same to a wheel felly.

2. A device of the character described, comprising three transverse bolts, longitudinal rods connecting the bolts and having downwardly bent ends, blocks on the ends of the bolts, and felly engaging prongs on said blocks, and devices on said bolts adapted to secure the same to a wheel felly.

3. A device of the character described, comprising transverse bolts, rods connecting the bolts and having downwardly projecting prongs or teeth, felly clamping blocks on the ends of the bolts, prongs or teeth on said blocks, and chains on said bolts adapted to be secured around the felly of a wheel.

4. A device of the character described, comprising transverse bolts, rods connecting the bolts and having downwardly projecting prongs or teeth, felly clamping blocks on the ends of the bolts, prongs or teeth on said blocks, chains on said bolts adapted to be secured around the felly of a wheel, links at the ends of the end bolts, and a flexible connecting device secured to the links at one end and adapted to hold the device against rearward movement.

5. In combination with a vehicle wheel and a brake beam, of an anti-skidding device, means on said anti-skidding device securing the same to the felly of the wheel, a snap hook on the brake beam, a chain connecting the anti-skidding device with said snap hook, and downwardly projecting teeth on said anti-skidding device.

In testimony whereof I have signed my name to this specification in the presence of two subscribing witnesses.

ROBERT M. WINSCH.

Witnesses:
  R. H. KRENKEL,
  J. A. L. MULHALL.